Sept. 3, 1963 W. A. GALE 3,102,784
PROCESS FOR MAKING ANHYDROUS LITHIUM PERCHLORATE
AND LITHIUM PERCHLORATE TRIHYDRATE
Filed Aug. 3, 1960

INVENTOR:
WILLIAM A. GALE,
BY
ATTORNEYS

United States Patent Office 3,102,784
Patented Sept. 3, 1963

3,102,784
PROCESS FOR MAKING ANHYDROUS LITHIUM PERCHLORATE AND LITHIUM PERCHLORATE TRIHYDRATE
William A. Gale, Whittier, Calif., assignor to American Potash & Chemical Corporation, a corporation of Delaware
Filed Aug. 3, 1960, Ser. No. 47,254
5 Claims. (Cl. 23—85)

This invention relates to a process for making anhydrous lithium perchlorate and lithium perchlorate trihydrate.

Anhydrous lithium perchlorate is used as a source of oxygen in solid rocket propellants. It is a white crystalline salt containing a little more than 60% by weight of oxygen and is, therefore, an oxidizing agent of some power. It has not been available heretofore in large quantities nor at a price which would permit its more extensive or regular use in rocket propellant compositions. The application of this material is not limited because of spontaneous explosive characteristics.

The lithium perchlorate trihydrate can be converted readily to crystalline anhydrous lithium perchlorate and lithium perchlorate trihydrate which are free from contamination by materials deleteriously affecting their stability against spontaneous explosion.

Figure 1:
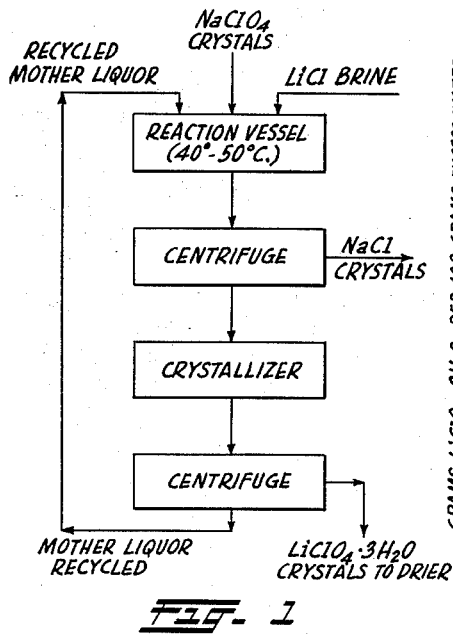
Figure 2:
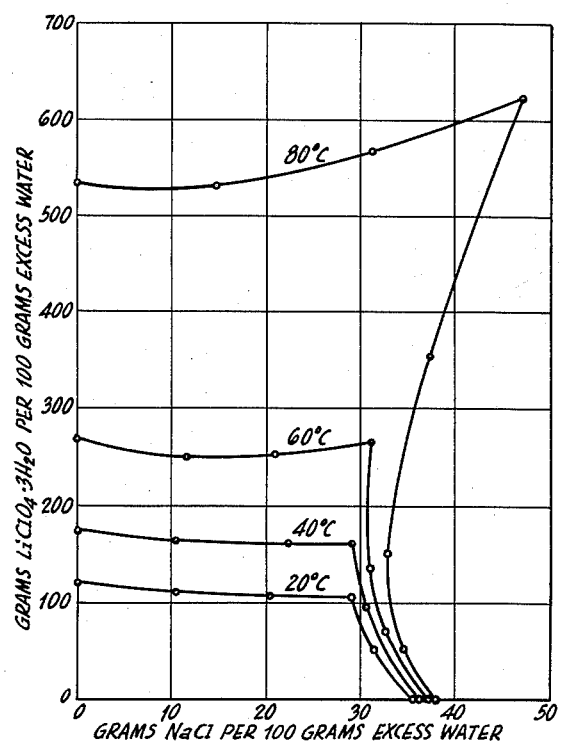

These and other objects are attained by this invention which will be understood from the following description, reference being made to the accompanying drawings in which FIGURE 1 is a diagrammatic representation of the process in its preferred form and FIGURE 2 is a diagram showing the mutual solubility relationships of lithium perchlorate and sodium chloride at various temperatures.

The most pertinent facts revealed by the diagram of FIGURE 2 are the relative positions of the monovariant points designated hereinafter the "two-salt points." These are the points at which the two branches of each isotherm meet, and it may be seen that these points represent the compositions of solutions saturated with both solid phases lithium perchlorate trihydrate and sodium chloride at such temperatures.

In addition to the complete isotherms shown in the diagram of FIGURE 2, there has also been determined the compositions of the solutions at the "two-salt points" for a wide range of temperatures. The more pertinent of such results are included in the following table of typical values:

*Composition of Solution Saturated with $LiClO_4 \cdot 3H_2O$ and NaCl at Various Temperatures*

| Temperature, °C. | Grams per 100 grams of total water | | Grams of salts which will dissolve in 100 grams of excess water | |
|---|---|---|---|---|
| | $LiClO_4$ | NaCl | $LiClO_4 \cdot 3H_2O$ | NaCl |
| 0 | 32.5 | 25.0 | 58.7 | 29.9 |
| 10 | 41.0 | 23.5 | 76.5 | 29.7 |
| 20 | 49.9 | 22.0 | 100.7 | 29.5 |
| 30 | 59.0 | 20.6 | 127.0 | 29.4 |
| 40 | 68.9 | 19.2 | 159.6 | 29.5 |
| 50 | 79.5 | 17.9 | 200.0 | 30.0 |
| 60 | 92.6 | 16.6 | 263.1 | 31.2 |
| 80 | 133.1 | 15.4 | 618.3 | 47.4 |

The term "excess water" means water in excess of that required to express all of the dissolved lithium perchlorate in terms of the trihydrate, $LiClO_4 \cdot 3H_2O$.

Figure 3:
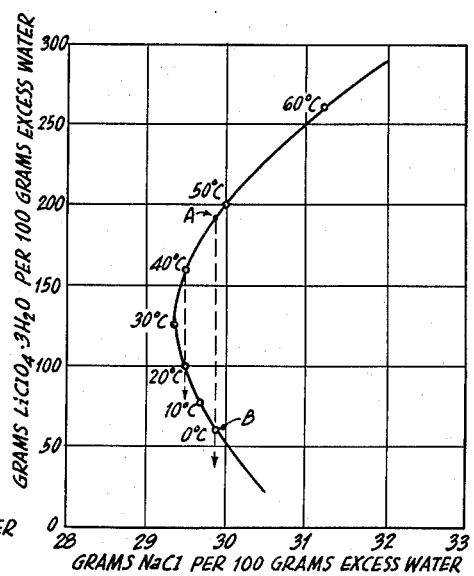

These results have been plotted on the diagram shown as FIGURE 3. The curve, which has been drawn through these points as shown, represents the polytherm traced by the "two-salt point" saturated with both solid phases $LiClO_4 \cdot 3H_2O$ and NaCl at various temperatures. The discovery of the unusual shape of this curve constitutes an important portion of the basis of this invention.

Generally, this invention comprises reacting more or less dry $NaClO_4$ crystals and an aqueous solution of LiCl (about 40–50% LiCl) in a liquor which is already saturated with respect to sodium chloride and somewhat less than saturated with respect to lithium perchlorate trihydrate. The desired relatively pure lithium perchlorate trihydrate is precipitated from the solution by cooling the solution from the temperature at which NaCl is precipitated (preferably about 40–50° C.) down to about 20° C. or lower. The required maximum lower temperature is determined by dropping a vertical line from the point on the graph of FIGURE 3, e.g. A representing the NaCl precipitation temperature. The point of intersection, e.g. B is the maximum $LiClO_4 \cdot 3H_2O$ precipitation temperature. The process is a cyclical one, the aforementioned liquor used as a reaction milieu being the material remaining on the completion of one cycle. Neither evaporation nor dilution is needed during the course of the process.

More particularly, it is convenient and economical to use essentially dry $NaClO_4$ crystals in the preparation of lithium perchlorate from $NaClO_4$ and LiCl. In the manufacture of sodium perchlorate, a high degree of purity usually requires a crystallization step in which solid $NaClO_4$ is produced. This product, possibly as a moist cake from a centrifuge, can be directly used to advantage in the process of this invention.

Also, instead of feeding solid lithium hydroxide monohydrate and an aqueous solution of HCl into the reactor, as has been proposed before, making it necessary to evaporate the excess water so introduced, it has been discovered that it is far more convenient and economical to supply the lithium chloride in the easily measurable form of a previously prepared concentrated solution. In fact, lithium chloride is often produced and sold on the market in the form of an aqueous solution, or brine, at concentrations up to 45 weight percent, for use in air conditioning, humidity control and other industrial purposes. Theoretically, a 44% LiCl brine would supply just the right amount of water for a balanced cycle in the process of this invention, without either excess dilution or the necessity for an evaporation step.

However, since in actual practice some water is lost from the cycle by entrainment in the solids removed, the water introduced with the raw materials (i.e., the moist $NaClO_4$ crystals, together with a slightly weaker lithium chloride brine), can usually be tolerated without causing a substantial build-up of liquid volume in the cycle, particularly in view of the fact that a small bleed-off of end liquor is desirable in order to purge the cycle of any accumulating impurities.

FIGURE 1 is a flow sheet setting forth the series of operations. The sodium perchlorate crystals and the lithium chloride brine, the reactants being provided in stoichiometric quantities, are fed to the reaction vessel, conveniently and preferably maintained at a temperature within the range 40–50° C. The sodium perchlorate and lithium chloride react therein, sufficient of the lithium perchlorate and sodium chloride being produced to yield a solution which is just less than saturated with respect to lithium perchlorate but more than saturated with respect to sodium chloride. During the course of the reaction, the sodium chloride precipitates out and is removed in any convenient manner. In the flow sheet, a centrifuge is shown as means for removing the sodium chloride crystals. Thereafter, the solution is cooled to a temperature at or below that at which NaCl has the same solubility, as described in greater particularity below, so as to cause the precipitation of quantities of pure lithium perchlorate trihydrate. The solution or liquor in which the reaction takes place is that which is derived from a previous cycle and is a liquor which is saturated with respect to sodium chloride but somewhat less than saturated with respect to lithium perchlorate.

No extra water need be added, nor is an evaporation step necessary, yet a relatively pure lithium perchlorate trihydrate is obtained provided that a certain essential requirement is met. This consists in continuing the cooling step through at least a minimum range of temperatures, the extent of which is determined by the starting temperature. The higher the starting temperature, up to a maximum of 50° C., or slightly over, the lower must the cooling step be carried in order to ensure that no solid sodium chloride will be present in the crop of lithium perchlorate trihydrate.

This unexpected result flows from the discovery that the polythermal curve of FIGURE 3 changes direction as the temperature is lowered from the higher range (40°–50° C.) through 30° C. to a lower range of 20° C. down to 0° C. or lower. Above about 30° C. the solubility of NaCl in saturated solutions of lithium perchlorate trihydrate decreases with decreasing temperature, whereas below 30° C. it increases with further decrease in temperature as shown. Hence, if one starts with a solution saturated with both $LiClO_4 \cdot 3H_2O$ and NaCl at a temperature above 30° C., such, for example, as that represented by point A at approximately 48.5° C., and cools this solution for the crystallization of a crop of $LiClO_4 \cdot 3H_2O$, it is necessary to continue this cooling step down at least to the point where the vertical line through point A intersects the lower leg of the polythermal curve at point B, which in this case is seen to be at approximately 0° C. At this point it will be seen that the solubility of NaCl, on the basis shown, is just equal to that in the hot solution at point A. Thus, any small amount of NaCl which may have crystallized at intermediate temperatures will be redissolved without the necessity of adding extra water for this purpose.

Were a temperature considerably higher than 50° C. chosen as the NaCl precipitating and separating temperature, e.g., 60° C. or higher, subsequent cooling would have to be carried to an excessive distance below 0° C. unless dilution were added to avoid contamination of the lithium perchlorate trihydrate with solid NaCl. Such steps would be either difficult to carry out or would not take full advantage of the benefits of this invention. Therefore, the preferred range of NaCl separation temperatures is between 40° and 50° C. as previously stated. However, it is not desired to confine the scope of this invention strictly to these limits as it is quite obvious that temperatures slightly higher than 50° C., such as 55° C., may be used. Also, a temperature of 30° C. or below might be chosen, provided the subsequent cooling interval is sufficient to provide an adequate crop of lithium perchlorate trihydrate and thus result in an economical cycle. In this event, it would be unnecessary to consult FIGURE 3 or determine mutual solubilities, since any temperature between 30° C. and the freezing point of the solution will be a temperature whereat NaCl is more soluble than at 30° C. while $LiClO_4 \cdot 3H_2O$ exhibits decreased solubility and will be precipitated thereat.

Of course, it would be possible to carry out the actual reaction at substantially higher temperatures, but it is still essential that the reactants be provided in stoichiometric ratios and in quantities appropriate to insure that when later cooled to a temperature not in excess of 50° C., the solution will be just saturated with respect to lithium perchlorate trihydrate and, hence, substantially more than saturated with respect to sodium chloride. For example, the initial reaction may be carried out at 80° C. with the quantities being determined as aforementioned, all calculations being based upon 40–50° C. Thereafter the solution is cooled to 40–50° C. so as to allow sodium chloride to precipitate and, following centrifuging, the solution is further cooled to at least a temperature of from 20° C. down to 0° C. or lower depending upon the NaCl centrifuging temperature, as previously stated, so as to precipitate the desired lithium perchlorate trihydrate.

When the entire cycle is confined within the temperature limitations mentioned, it is unnecessary either to add extra water or to evaporate at any time.

As shown in FIGURE 1, the slurry formed in the crystallizer is passed to the centrifuge and the lithium perchlorate trihydrate crystals removed and advanced to the dryer. These are readily converted to crystalline anhydrous lithium perchlorate by melting the trihydrate, driving off the water of crystallization and then drying at a temperature of between approximately 160°–180° C. It may be necessary to wash the lithium perchlorate trihydrate before drying.

An example is set forth below for illustrative purposes, but this is not to be interpreted as imposing limitations on the scope of the invention other than as set forth in the appended claims.

A quantity of end liquor of the following equivalent composition, weighing 613.9 lbs., was taken from a previous cycle as the starting liquor of a new cycle:

*Starting Liquor—Temperature 20° C.*

|  | Pounds | Grams/100 grams of excess $H_2O$ |
| --- | --- | --- |
| $LiClO_4 \cdot 3H_2O$ | 267.6 | 100.0 |
| NaCl | 78.7 | 29.5 |
| Excess $H_2O$ | 267.6 | 100.0 |
| Total | 613.9 |  |

To this liquor was added 122.5 pounds of dry sodium perchlorate crystals together with 96.4 pounds of a 44% lithium chloride solution, making a total of 218.9 pounds of added materials.

The total mixture was then equivalent to the following, although not necessarily all in solution:

*Total Mixture (Equivalent)*

|  | Pounds | Grams/100 grams of excess $H_2O$ |
| --- | --- | --- |
| $LiClO_4 \cdot 3H_2O$ | 428.0 | 160.0 |
| NaCl | 137.2 | 51.3 |
| Excess $H_2O$ | 267.6 | 100.0 |
| Total | 832.8 |  |

This mixture was heated to 40° C. at which point all of the lithium perchlorate had dissolved, but 58.5 lbs. of NaCl remained as a solid phase and was filtered off, leaving a liquor approximately of the following equivalent composition:

*Liquor at 40° C.*

|  | Pounds | Grams/100 grams of excess $H_2O$ |
| --- | --- | --- |
| $LiClO_4 \cdot 3H_2O$ | 428.0 | 160.0 |
| NaCl | 78.7 | 29.5 |
| Excess $H_2O$ | 267.6 | 100.0 |
| Total | 774.3 |  |

This liquor was then cooled to 20° C., causing the crystallization of a crop of solid $LiClO_4 \cdot 3H_2O$ weighing approximately 160.4 lbs. These crystals were filtered off, washed and dehydrated in a suitable type of dryer to produce approximately 106.4 pounds of essentially pure anhydrous $LiClO_4$, while the mother liquor, having approximately the same weight and composition of the starting solution, was returned for use in the next cycle.

Obviously, many modifications and variations of this invention may be made without departing from the spirit and scope thereof, and therefore only such limitations should be imposed as are indicated in the appended claims.

I claim:

1. The process for making lithium perchlorate trihydrate comprising: (1) forming an aqueous reaction milieu consisting of the reaction product of sodium perchlorate and lithium chloride in about stoichiometric quantities, said reactants being provided in quantities sufficient to saturate the said solution with NaCl when said solution is at a temperature within the range 40–50° C.; (2) reacting in the said reaction milieu additional sodium perchlorate and lithium chloride in about stoichiometric quantities and in sufficient quantity to form a solution just less than saturated with respect to lithium perchlorate trihydrate when said solution is at a temperature within the range about 40–50° C., said lithium chloride being provided in the form of an aqueous solution containing 40–50% by weight LiCl; (3) adjusting the temperature of the said solution to within the temperature range about 40–50° C. and allowing sodium chloride to precipitate therefrom without precipitating lithium perchlorate trihydrate; (4) separating therefrom the said sodium chloride so precipitated; (5) cooling said solution to precipitate lithium perchlorate trihydrate, said cooling being carried to a temperature at which the solubility of sodium chloride in said solution is not less than it was in said solution at the said higher temperature of step 3; (6) separating the so formed lithium perchlorate trihydrate precipitate therefrom; and (7) repeating steps 2–6 using the liquor remaining after the said lithium perchlorate trihydrate removal as the said aqueous reaction milieu of step 1.

2. The process for making lithium perchlorate trihydrate comprising: (1) forming an aqueous reaction milieu consisting of the reaction product of sodium perchlorate and lithium chloride in about stoichiometric quantities, said reactants being provided in quantities sufficient to saturate the said solution with NaCl when said solution is at a temperature of about 40° C.; (2) reacting in the said reaction milieu additional sodium perchlorate and lithium chloride in about stoichiometric quantities and in sufficient quantity to form a solution just less than saturated with respect to lithium perchlorate trihydrate when said solution is at a temperature of about 40° C., said lithium chloride being provided in the form of an aqueous solution containing 40–50% by weight LiCl; (3) adjusting the temperature of the said solution to a temperature of about 40° C. and allowing sodium chloride to precipitate therefrom without precipitating lithium perchlorate trihydrate; (4) separating therefrom the said sodium chloride so precipitated; (5) cooling said solution to a temperature of about 20° C. to precipitate lithium perchlorate trihydrate; (6) separating the so formed lithium perchlorate trihydrate precipitate therefrom; and (7) repeating steps 2–6 using the liquor remaining after said lithium perchlorate trihydrate removal as the said aqueous reaction milieu of step 1.

3. The process for making lithium perchlorate trihydrate comprising: (1) forming an aqueous reaction milieu consisting of the reaction product of sodium perchlorate and lithium chloride in about stoichiometric quantities, said reactants being provided in quantities sufficient to saturate the said solution with NaCl when said solution is at a predetermined temperature between 30° C. and 50° C.; (2) reacting in the said reaction milieu additional sodium perchlorate and lithium chloride in about stoichiometric quantities and in sufficient quantity to form a solution just less than saturated with respect to lithium perchlorate trihydrate when the said solution is at said predetermined temperature between 30° C. and 50° C., said lithium chloride being provided in the form of an aqueous solution containing 40–50% by weight LiCl; (3) adjusting the temperature of the said solution to the said predetermined temperature and allowing sodium chloride to precipitate therefrom without precipitating lithium perchlorate trihydrate; (4) separating therefrom the said sodium chloride so precipitated; (5) cooling said solution to a temperature represented by a point on the curve of FIGURE 3, which point is on the said curve and directly beneath the said temperature at which the said NaCl is precipitated whereby to precipitate lithium perchlorate trihydrate; (6) separating the so formed lithium perchlorate trihydrate precipitate therefrom; and (7) repeating steps 2–6 using the liquor remaining after the said lithium perchlorate trihydrate removal as the said aqueous reaction milieu of step 1.

4. The process for making lithium perchlorate trihydrate comprising: (1) forming an aqueous reaction milieu consisting of the reaction product of sodium perchlorate and lithium chloride in about stoichiometric quantities, said reactants being provided in quantities sufficient to saturate the said solution with NaCl when said solution is at a predetermined temperature of not in excess of about 30° C.; (2) reacting in the said reaction milieu additional sodium perchlorate and lithium chloride in about stoichiometric quantities and in sufficient quantity to form a solution just less than saturated with respect to lithium perchlorate trihydrate when said solution is at said temperature of not in excess of about 30° C., said lithium chloride being provided in the form of an aqueous solution containing 40–50% by weight LiCl; (3) adjusting the temperature of the said solution to said temperature of not in excess of about 30° C. and allowing sodium chloride to precipitate therefrom without precipitating lithium perchlorate trihydrate; (4) separating therefrom the said sodium chloride so precipitated; (5) cooling said solution to a temperature less than the said predetermined temperature and in excess of the freezing point of the said solution to precipitate lithium perchlorate trihydrate; (6) separating the so formed lithium perchlorate trihydrate precipitate therefrom; and (7) repeating steps 2–6 using the liquor remaining after the said lithium perchlorate trihydrate removal as the said aqueous reaction milieu of step 1.

5. The process of claim 4 wherein the said predetermined temperature is about 30° C.

References Cited in the file of this patent

UNITED STATES PATENTS

| 1,453,984 | Long | May 1, 1923 |
| 1,965,457 | Ehrhardt | July 3, 1934 |
| 2,739,873 | Schumacher | Mar. 27, 1956 |

OTHER REFERENCES

Mellor, "Comprehensive Treatise on Inorganic and Theoretical Chemistry," Supp. II, part I, pages 606, 608 (1956), Longmans, Green and Co., New York.